Figure 1:
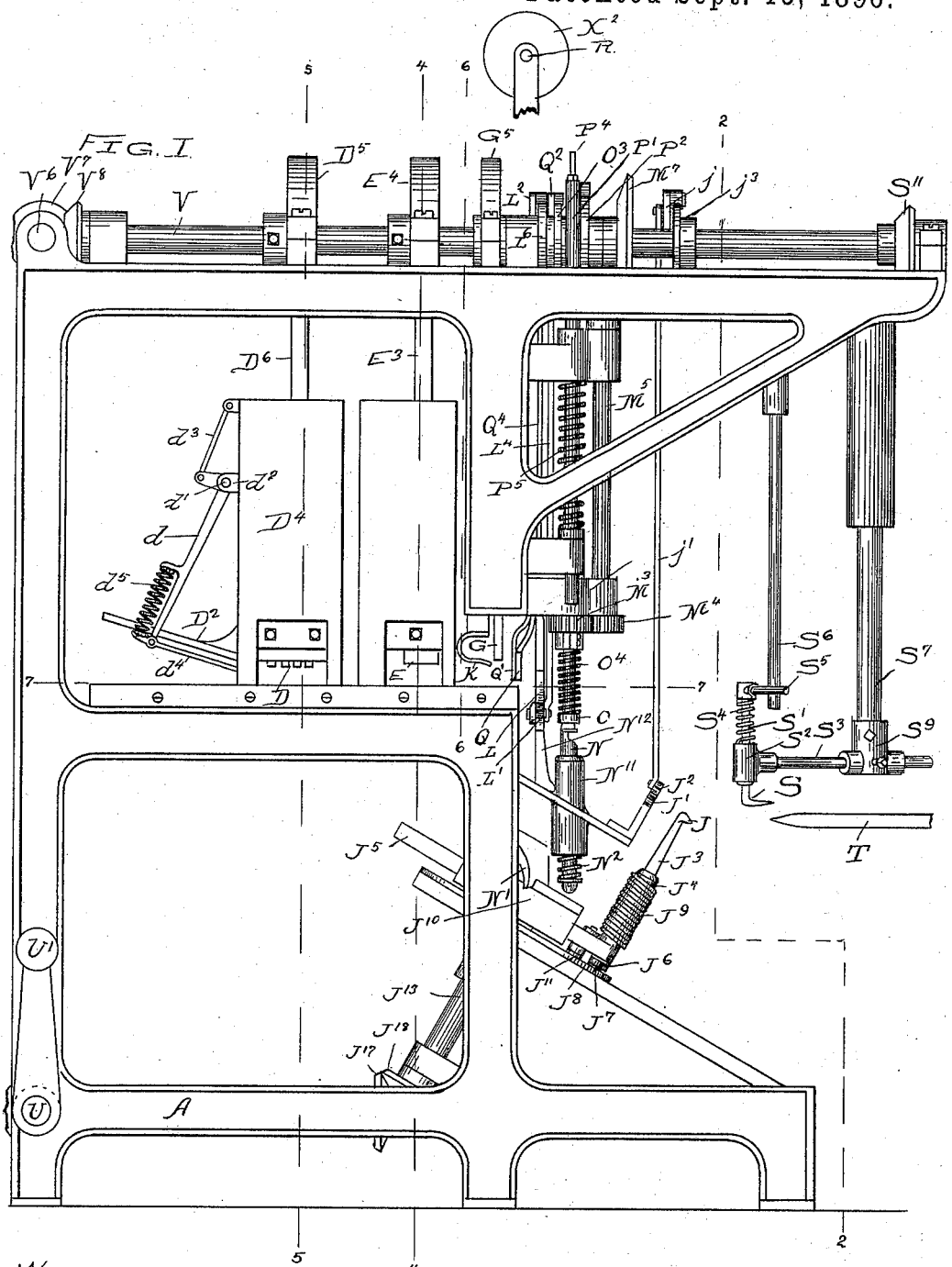

(No Model.) 8 Sheets—Sheet 1.

J. FLETCHER.
MACHINE FOR MAKING AND STRINGING TAGS.

No. 567,809. Patented Sept. 15, 1896.

WITNESSES:

INVENTOR:
JOHN FLETCHER
BY Munday, Evarts & Adcock
HIS ATTORNEYS (No Model.) 8 Sheets—Sheet 2.
J. FLETCHER.
MACHINE FOR MAKING AND STRINGING TAGS.
No. 567,809. Patented Sept. 15, 1896.
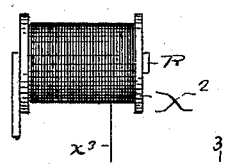
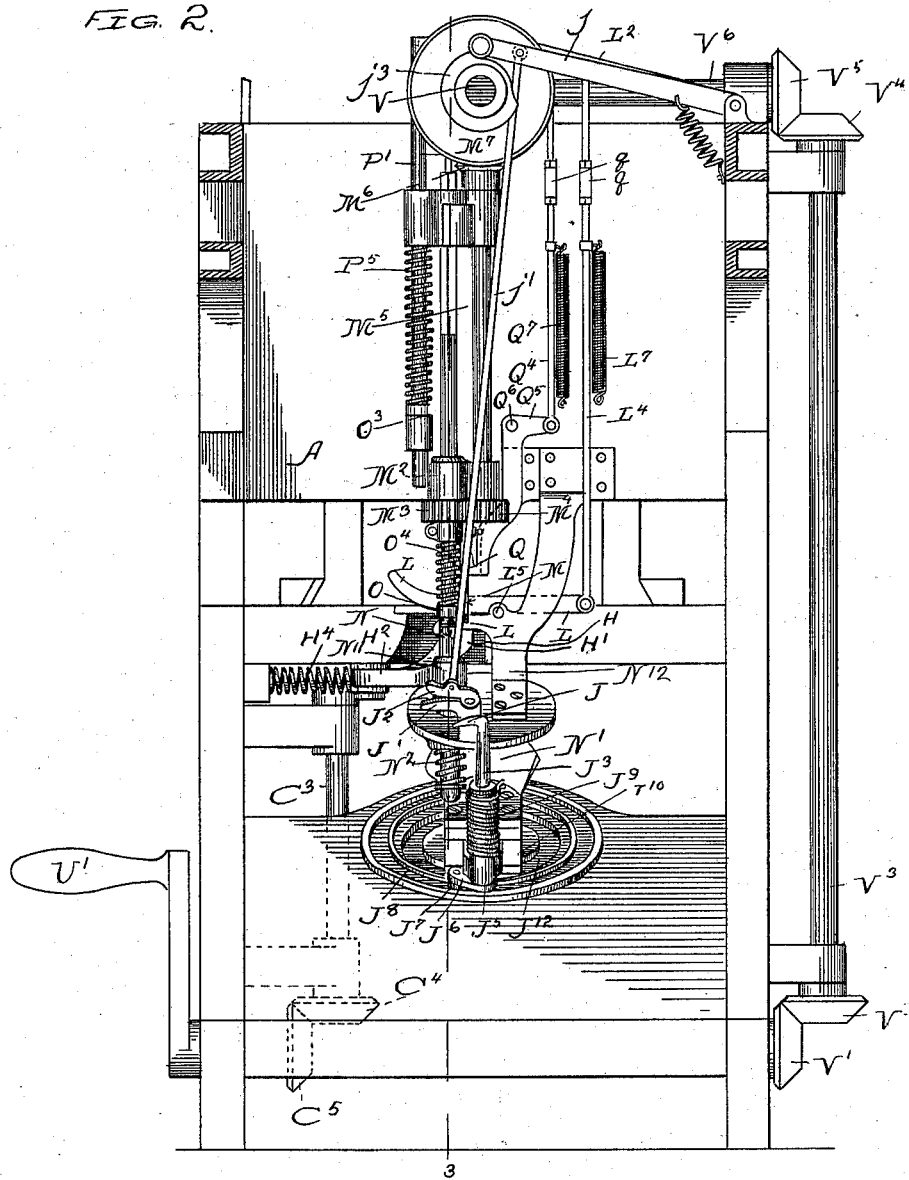
FIG. 2.
WITNESSES:
Sew. C. Curts
A. W. Munday
INVENTOR:
JOHN FLETCHER
By Munday, Evarts & Adcock,
HIS ATTORNEYS.

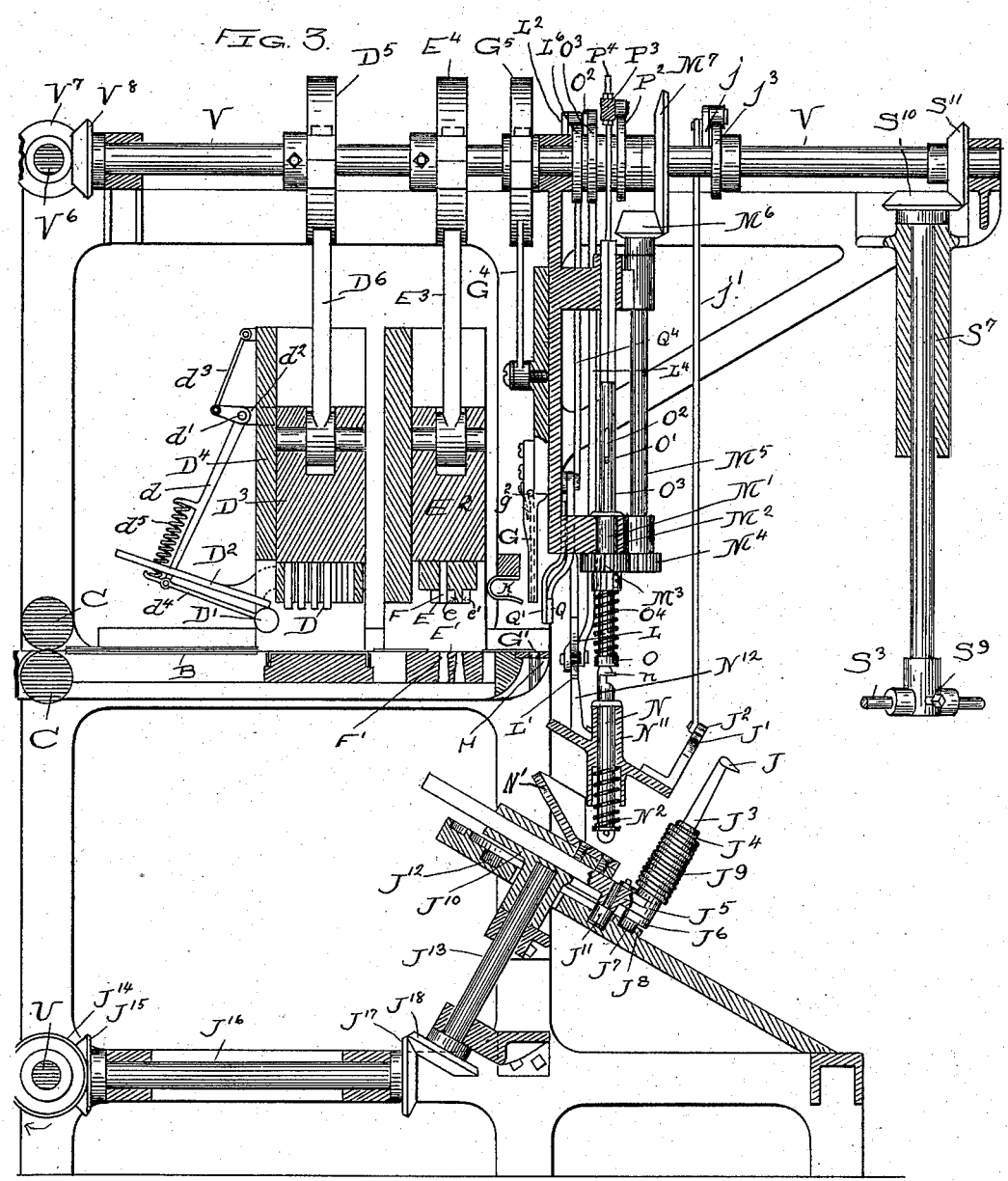

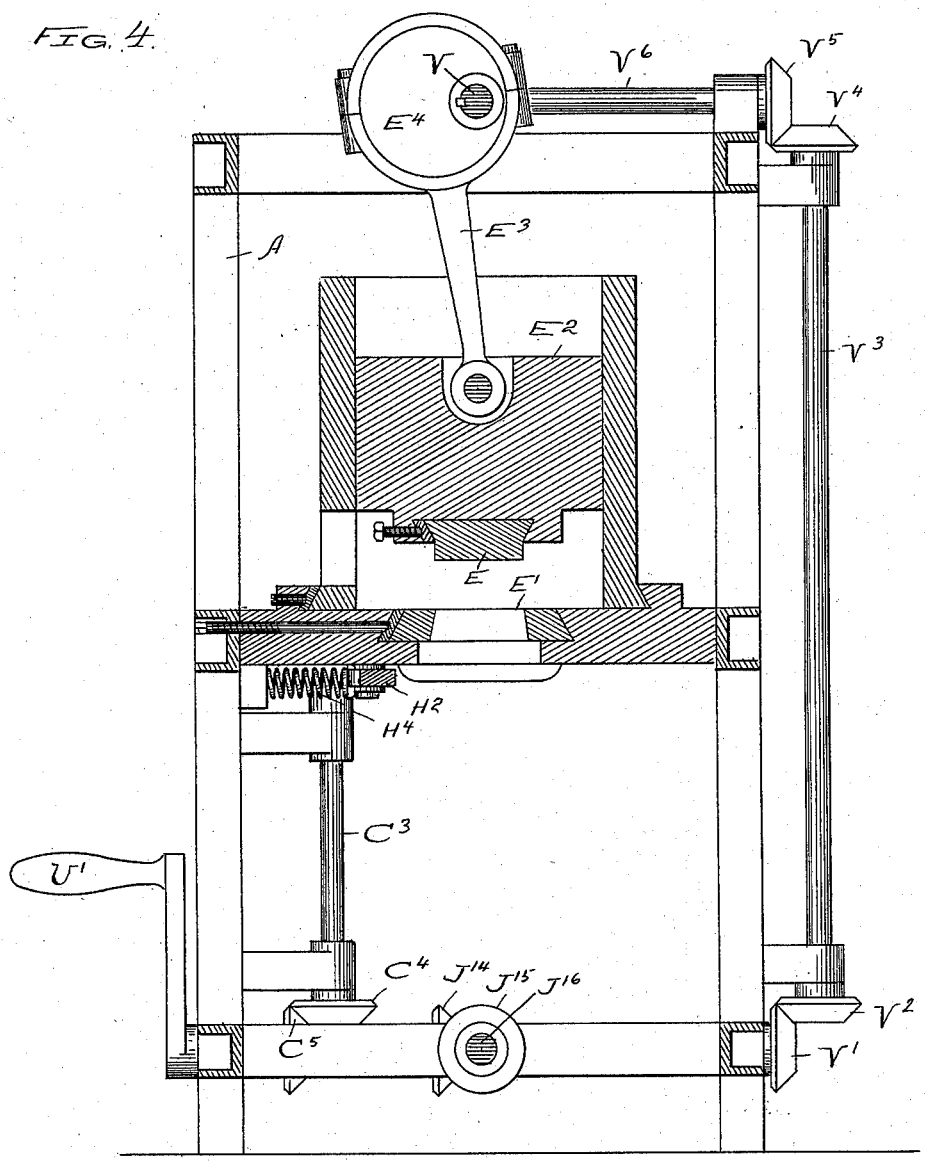

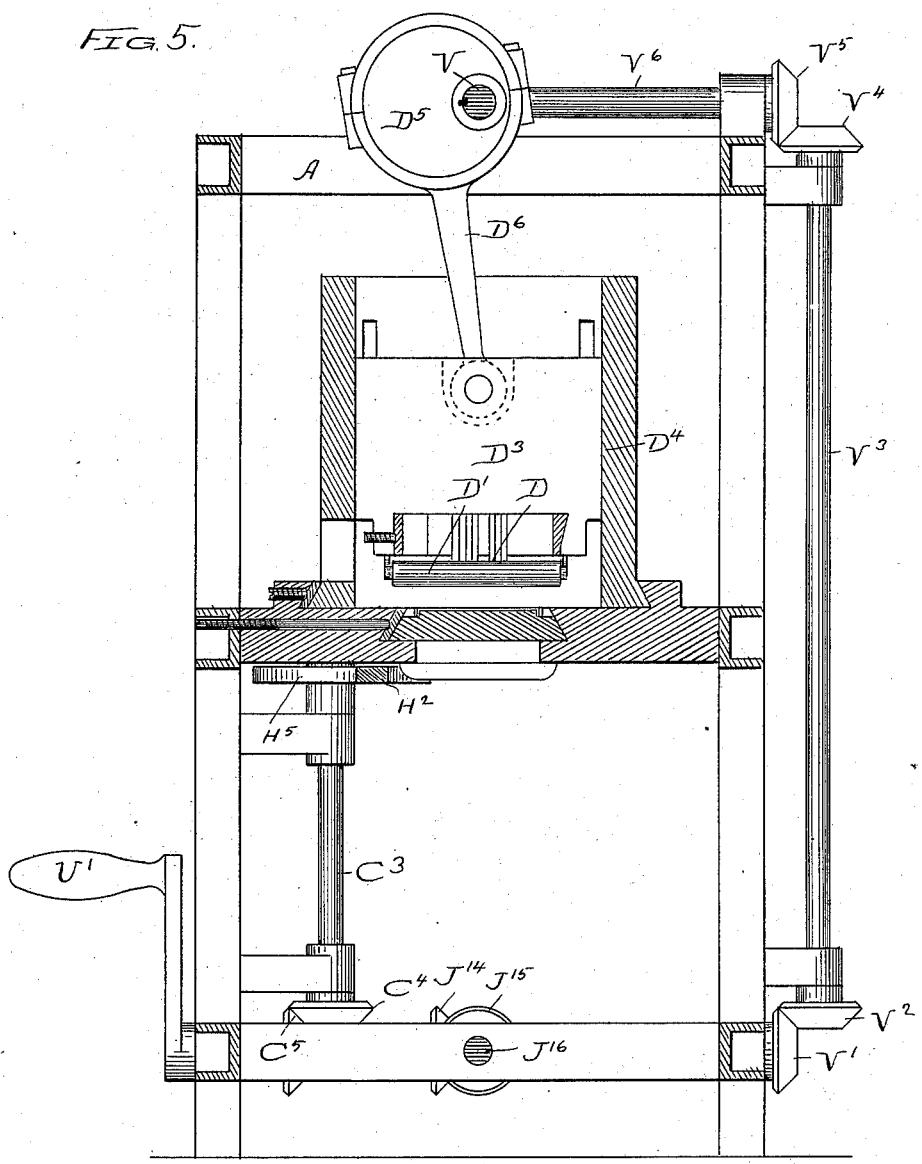

(No Model.) 8 Sheets—Sheet 6.
J. FLETCHER.
MACHINE FOR MAKING AND STRINGING TAGS.
No. 567,809. Patented Sept. 15, 1896.
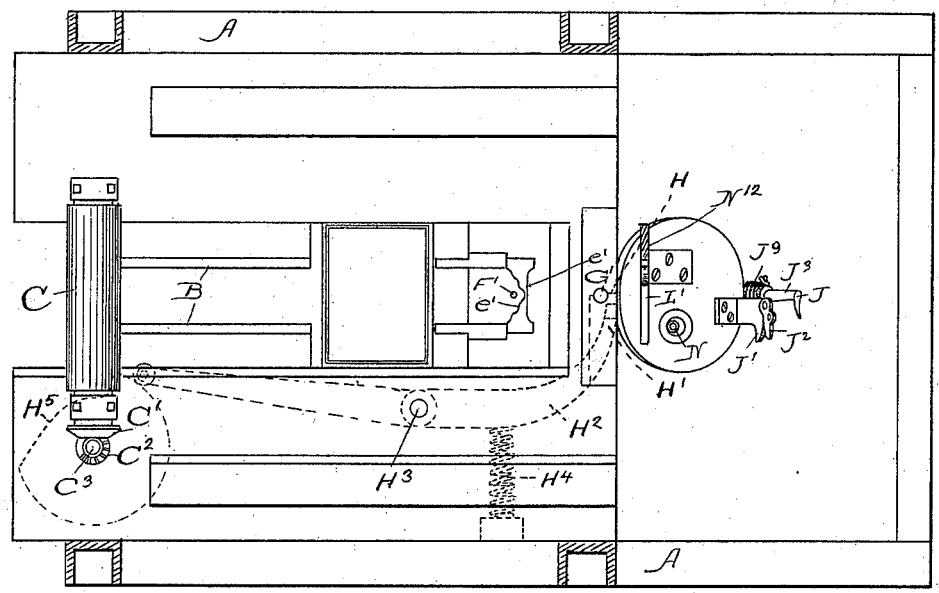
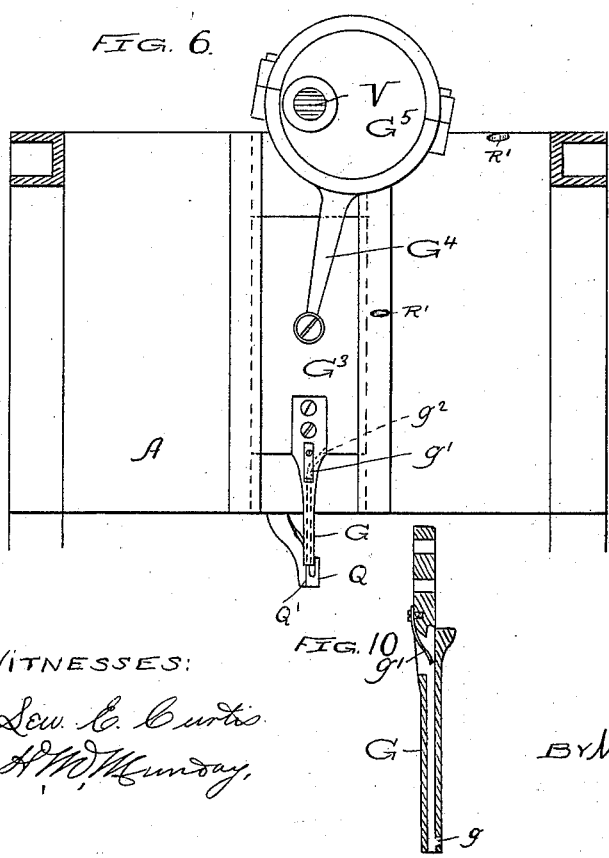
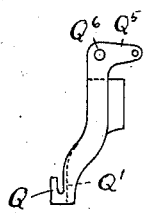
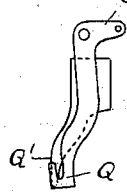
WITNESSES:
Sew. E. Curtis
H. W. Munday
INVENTOR:
JOHN FLETCHER
By Munday, Evarts & Adcock,
HIS ATTORNEYS (No Model.) 8 Sheets—Sheet 7.

J. FLETCHER.
MACHINE FOR MAKING AND STRINGING TAGS.

No. 567,809. Patented Sept. 15, 1896.

WITNESSES:
Geo. E. Curtis
H. M. Munday

INVENTOR:
JOHN FLETCHER
By Munday, Evarts & Adcock
HIS ATTORNEYS.

(No Model.) 8 Sheets—Sheet 8.
J. FLETCHER.
MACHINE FOR MAKING AND STRINGING TAGS.
No. 567,809. Patented Sept. 15, 1896.
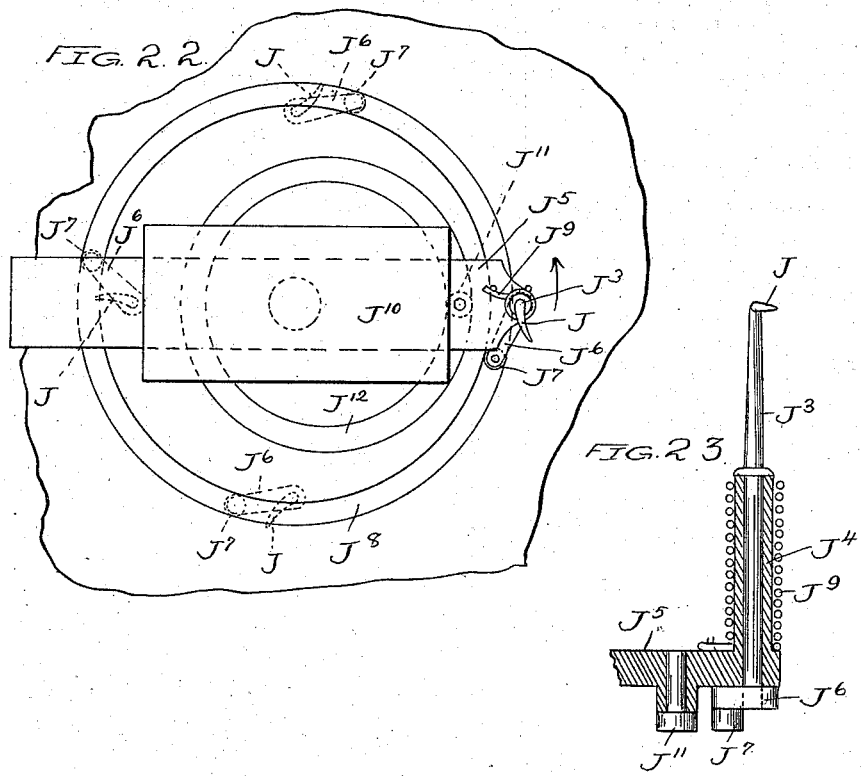
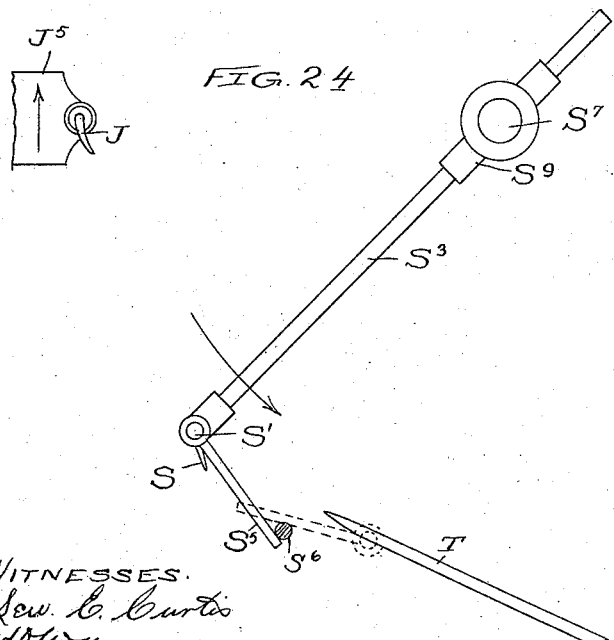
WITNESSES.
Sew. C. Curtis
H. W. Munday
INVENTOR:
JOHN FLETCHER
By Munday, Evarts & Adcock
HIS ATTORNEYS
THE NORRIS PETERS CO., PHOTO-LITHO., WASHINGTON, D. C.

UNITED STATES PATENT OFFICE.

JOHN FLETCHER, OF CHICAGO, ILLINOIS, ASSIGNOR TO ABRAHAM FLETCHER, OF SAME PLACE.

MACHINE FOR MAKING AND STRINGING TAGS.

SPECIFICATION forming part of Letters Patent No. 567,809, dated September 15, 1896.

Application filed February 7, 1895. Serial No. 537,622. (No model.)

*To all whom it may concern:*

Be it known that I, JOHN FLETCHER, a citizen of the United States, residing in Chicago, in the county of Cook and State of Illinois, have invented a new and useful Improvement in Machines for Making and Stringing Tags, of which the following is a specification.

My invention relates to the manufacture of tags such as are commonly known as "price-tags" and commonly used for attaching to articles for sale to indicate the price, size, number, or other data. These tags are usually made of cardboard or of other suitable material, and are provided with a hole through which a string is passed and tied, so that by passing the loop or doubled string around or through an article and then passing the tag itself through the loop the tag may thus be quickly and conveniently applied to or removed from the article.

The object of my invention is to provide an automatic machine of a simple and durable construction by means of which these stringed tags may be rapidly and cheaply manufactured complete and ready for use or attachment to various articles: that is to say, the object is to provide a machine or apparatus that will operate automatically to print the tags, cut them out from a continuous strip of paper or cardboard, punch the hole for the thread or string, pass the thread or string through the hole, feed or pull the string to form the loop the required length, tie or knot the string, and finally strip or discharge the stringed tag and deliver the same onto a suitable hook or receiver.

My invention consists in the means I have invented or devised for accomplishing this result or object: that is to say, it consists in the novel construction, and in the various novel combinations of the following devices or operative parts comprising my new machine, viz.: a guide or way along which the tag-strip is fed; a device or mechanism for feeding the tag-strip along the guide, first to the printing device or mechanism, thence to the tag-cutting and hole-punching devices, and thence to the tag threading or stringing device; a tag-printing device or mechanism; a tag-cutting device; a device for punching the hole in the tag; a tag threading or stringing device; a device for stripping the tag from the threading or stringing device; a spool-holder for the spool of string or thread; a suitable guide or guides for the string; a holder for the end of the string or thread; a looper or loop-puller and spreader operating as a measuring-feed to determine the length of the loop and to spread or separate the strands of the loop; a loop-holder to stretch and hold the free end of the loop while the knot is being formed; a second loop or string-holder or clamp or tension device for holding both strands of the loop between the knotter and the tag threading or stringing device while the slack for the knot is being pulled through; a knotter or mechanism for tying the knot, the same consisting, preferably, of a hollow tying-bolt or mandrel around which the strands of the string are wound; a revolving hook or wiper for carrying or wrapping the strands of the string around the tying-bolt or mandrel; a hollow guard to hold the loops on the tying-bolt or mandrel, and a knotting-hook adapted to reciprocate inside the tying-bolt or mandrel; a thread-cutter for severing the strand of the string leading through the needle or threading device to the spool; a device for stripping or discharging the strung tag from the machine and delivering it onto a hook or receiver, and, finally, the receiver or hook for receiving the finished and strung tags as they are made by and delivered from the machine.

Figure 20:
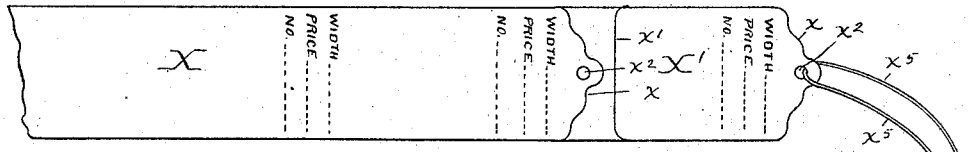
Figures 17, 18:
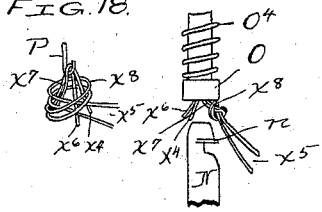
Figure 19:
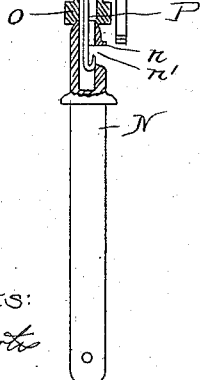
Figure 21:
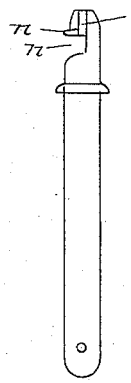

In the accompanying drawings, forming a part of this specification, Figure 1 is a side elevation of a machine embodying my invention. Fig. 2 is a front elevation, partly in section, looking from line 2 2 of Fig. 1. Fig. 3 is a vertical longitudinal section on line 3 3 of Fig. 2. Figs. 4, 5, and 6 are vertical cross-sections on lines 4 4, 5 5, and 6 6, respectively, of Fig. 1. Fig. 7 is a plan view, partly in section, taken on line 7 7 of Fig. 1. Figs. 8 and 9 are detail views of the thread or string cutting device. Fig. 10 is a detail view of the tag stringing or threading device or needle. Figs. 11, 12, 13, 14, 15, 16, 17, and 18 are detail views illustrating successive stages of the operation. Fig. 19 is a detail vertical sectional view of the knotter. Fig. 20 is a plan view showing the tag and the strip from which the tag is formed. Fig. 21 is a detail view of the tying-bolt of the knotter. Fig. 22 is a plan view of the looper and its operating-cams taken on a plane parallel with the plane of revolution of the looper. Fig. 23 is a detail sectional view showing the looper-shaft, its operating-arm, and its carrying-arm. Fig. 24 is a detail plan view illustrating the operation of the stripping-hook in connection with the looper and the receiving hook or spindle.

Like letters of reference indicate like parts throughout all the figures.

In the drawings, A represents the frame of the machine. B is the guide or way along which the tag-strip X is fed by the feed device C, the same consisting, preferably, of two feed-rollers.

D is the printing device or mechanism, the same consisting, preferably, of a reciprocating platen in connection with an inking-roller D' and ink-pad $D^2$.

The tag-cutting device or mechanism E E' consists, preferably, of a movable knife E, having two cutting edges $e$ and $e'$, and two stationary knives E' E', the cutting edge $e$ of the knife, die, or punch E coöperating with one of the stationary knives E' to properly shape the top end $x$ of the tag X', while the other cutting edge, $e'$, of the movable knife E coöperates with the other stationary knife E' to properly form or shape the lower end $x'$ of the tag X'.

The device F F' for punching or forming the hole $x^2$ in the tag through which the string or thread $x^3$ is to be passed, consists, preferably, of a reciprocating punch or male die F and a female die F'. The movable hole-punching die F and the movable tag-cutting die or knife E are preferably both secured to the same cross-head $E^2$ and operated simultaneously, and the punch F is located back of the cutting-die E, so that while one tag is being severed from the strip by the die E the hole will be punched for the succeeding tag, thus enabling me to pass the thread or string through the hole $x^2$ before the tag X' is severed from the tag-strip X. By this means the tag-strip feeder C also serves to feed the tag forward to the stringing or threading device G and to bring the hole $x^2$ of the tag into accurate registry with the threading or stringing device.

Figure 11:
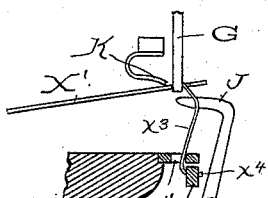
Figure 12:
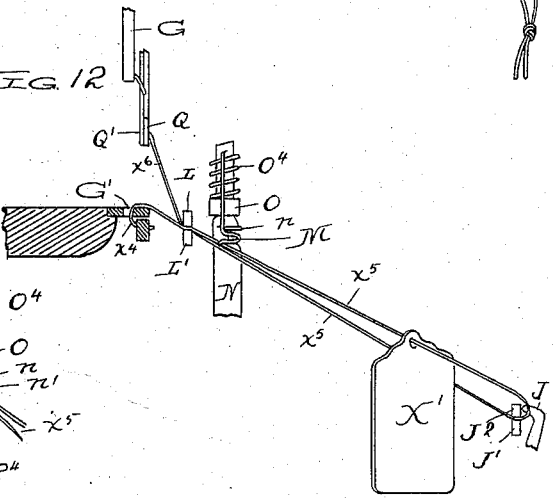
Figures 13, 14:
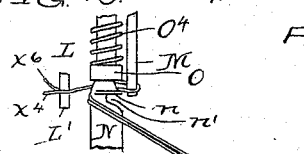
Figures 15, 16:
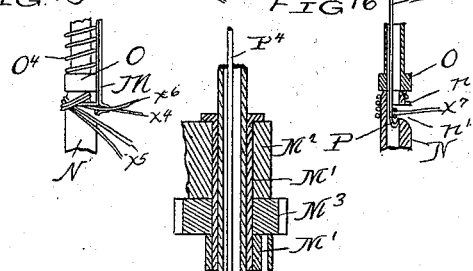

The tag threading or stringing device G consists, preferably, of a hollow punch or needle provided with an eye or hole $g$, near its lower end at the front side of the needle, through which the end $x^4$ of the thread or string $x^3$ projects. To receive the threading or stringing punch or needle G, the guideway or bed B is furnished with a female die or hole G'. The threading device or punch G is provided with a spring $g$, adapted to bear against the thread or string $x^3$ somewhat in the nature of a pawl to keep the thread from being pulled backward or out of the needle G, and also to give tension to the thread as it is fed or pulled forward through this hollow punch or needle. The hollow punch G has an eye $g^2$, through which the thread passes into it from the spool $X^2$. The threading or stringing device G is made about the diameter of the punch F, so that it will fit with some little friction in the hole $x^2$ in the tag X', and thus serve to lift the tag X' upward from the bed or guideway B when the threading-punch G is withdrawn. After the threading or stringing punch G has carried the end $x^4$ of the string or thread $x^3$, down through the hole $x^2$ in the tag and through the hole or die G', the string or thread holding device H H', consisting, preferably, of a pair of opening and closing jaws, and which at this time are open, now close together and grasp the end $x^4$ of the thread, which projects through the eye or hole $g$, and thus firmly hold this end of the thread or string while the punch or needle G is being withdrawn, and lifting the tag X' from its bed B, as before mentioned. After the tag-threading device G has been thus partially withdrawn the tag X' will be approximately in the position indicated in Fig. 11, and the portion of the string $x^3$ between the holder H and the threading-punch G will be in position to be caught by the movable or revolving looper or looping-hook J, and the string will then be pulled from the position indicated in Fig. 11 to that indicated in Fig. 12 by the movement of the looper J, thus forming the loop $x^5$, and at the same time carrying the tag forward with the looper and thus drawing it out of the way, as the tag X' is now on the upper or feeding strand $x^5$ of the loop. At the same time, or approximately at the same time, that the looper J engages the string $x^3$, as indicated in Fig. 11, the continued upward or withdrawing movement of the threading or stringing punch G carries the tag X' into engagement with the tag-stripper K and thus strips the tag from the punch G, thereby enabling the tag to be carried forward by the movement of the looper J. As the looper J pulls or feeds the string $x^3$ forward and forms the loop $x^5$ of the proper length the two strands of the loop are drawn between a pair of open string or loop clamping or tension jaws L L', the movable one of which L now closes upon the strands of the loop, thus bringing the two strands of the loop close together, so that they may both be caught by the revolving hook or wiper M of the knotter and by it carried around the hollow tying-bolt or mandrel N. After the strands of the loop are thus frictionally or tensionally clamped or held between the clamping or tension jaws L L' the string-holder H opens and releases that end of the thread, and the thread or string cutter Q Q' severs the other strand of the loop from the string $x^3$ close to the threading punch or needle G, as indicated in Fig. 12. The continued movement of the revolving hook or wiper M carries or wraps the free ends $x^4$ $x^6$ of the two strands of the loop first once around the tying-bolt or mandrel N above its lip or shoulder $n$, as indicated in Figs. 13 and 14, and next once around said bolt or mandrel below said lip or shoulder $n$ or in the notch $n'$, as indicated in Fig. 15, so that this last fold or wrap $x^7$ may be caught by the knotting-hook P, which reciprocates within the hollow mandrel or bolt N, and be by it drawn up through the first fold or wrap $x^8$ of the string-strands, as indicated in Figs. 17 and 18. To prevent the first wrap or fold $x^8$ being slipped or drawn off the upper end of the knotting or tying bolt N by the upward movement of the knotting-hook P, I provide a hollow guard or collar O, which fits down upon the upper end of the tying-bolt or mandrel N. To cause the first wrap or fold $x^8$ to come above the lip or shoulder $n$ and the second wrap or fold $x^7$ to fall or come below said lip or shoulder, I give the tying-bolt or mandrel N a slight reciprocating movement up and down, and to permit the knot to be properly formed and the wraps to be drawn off the tying-bolt or mandrel N the guard or collar O is also, of course, made to move or reciprocate, as well as the knotting-hook P, and for the same purpose the tying-bolt N is furnished with a vertical slot $N^2$. The tying-bolt N is furnished with a conical top or upper end to facilitate the stripping of the wraps therefrom, and also to cause the guard O to properly register with the tying-bolt and slip over the same.

The making of the tying-bolt hollow is the means I prefer to employ to provide the tying-bolt with a channel or way for the knotting-hook to work or fit in, so as to enable the latter to come properly into engagement with the wrap of the string; but other suitable means may be employed for this purpose, as, for example, by simply extending and slightly enlarging the vertical slot $n^2$, so that it will serve also as the channel or way for the knotting-hook, in which construction the channel or way for the knotting-hook and the vertical slot $n^2$ simply become one and the same. The transverse notch $n'$ is the means I prefer to employ for causing or permitting the lower wrap of the string to come into position for engagement with the knotting-hook, but other suitable means for this purpose may obviously be employed. The longitudinal slot $n^2$ is the means I prefer to employ to enable the knot to be stripped from the tying-bolt, but other suitable means may be employed for this purpose.

As the looper J is preferably or most conveniently given a continuous revolving movement and not stopped while the knot is being tied, I provide a supplemental holder J' J² for the outer or free end of the loop to hold the same while the knot is being tied. This holder J' J² consists, preferably, of a stationary hook on the frame of the machine over which the loop $x^5$ is carried by the looper J, as it is carried around. This holder is furnished with a movable clamping-jaw J² to prevent the string or loop slipping on the hook J' by reason of unequal tension on the two strands of the loop, and to prevent any possibility of the loop slipping off of this supplemental holder J' during the tying of the knot.

R is the spool holder or spindle upon which the spool $x^2$ of string $x^3$ is mounted, and R' are guides for the string.

S is the stripper or discharger or device for stripping or withdrawing the strung tag from the machine, the same consisting, preferably, of a movable or revolving hook adapted to catch the loop $x$ of the tag and pull it away, and thus draw the knot, as indicated in Fig. 18, tight, and draw the free ends $x^4$ $x^6$ entirely through the folds or warps of the knot and also out of the knotting-hook P. This stripper or discharger also serves to deliver the strung tags upon the receiver, hook, or spindle T, which is fixed to the stationary frame of the machine in the path of the movable hook S.

The necessary movements may be imparted to the several operative parts or devices requiring motion to be communicated to them by any suitable operating means or mechanism. The parts, however, are given their necessary motions or movements from a common driving-shaft U.

The necessary intermittent movement is preferably communicated to the upper feed-roll C by means of the spur-gear C', thereon meshing with a mutilated spur-gear $C^2$ on the shaft $C^3$, connected by bevel-gears $C^4$ $C^5$ with the driving-shaft U.

The printing device or platen D is preferably operated by a reciprocating movement from a cross-head $D^3$, working in suitable guides $D^4$ on the frame of the machine, and actuated by a cam or eccentric $D^5$ on the cam-shaft V, through the connecting-link $D^6$. The inking-roller D' of the printing mechanism is moved over the type of the platen and over the inking pad or plate $D^2$ by a bent lever $d$, pivoted at $d'$ to an arm $d^2$ on the cross-head $D^3$, the short arm of the lever being connected to a pivoted link $d^3$, which is pivoted to the stationary guide $D^4$, so that as the cross-head moves up and down the inking-roller will be moved across the face of the type, the inking-roller being mounted upon an arm $d^4$, pivoted to the end of the bent lever, which arm is held in place by a spring $d^5$.

The reciprocating cutter E and punch F are operated by a cross-head $E^2$, connected by a link $E^3$ with a cam or eccentric $E^4$ on the cam-shaft V.

The tag threading or stringing punch or needle G is reciprocated by a cross-head $G^3$, which is connected by a link $G^4$ with an eccentric $G^5$ on the cam-shaft V.

The movable jaw of the thread or string holder H is preferably operated by a lever $H^2$, pivoted at $H^3$ to the frame, the lever being moved one way to clamp the thread by a spring $H^4$, and in the opposite direction to open the holder by a cam $H^5$ on the vertical shaft $C^3$, through which motion is communicated to the feed-roller C. The movable jaw H of the thread-holder is preferably made integral with the operating-lever $H^2$, and consists of simply the end of said lever.

The looper or loop-pulling device J is preferably given two movements, one a rocking movement to turn the looper-hook to the proper position for engaging or disengaging the string or loop, and the other a bodily movement to pull the string or loop the required length and to bring the looper into engagement with the string. The first of the movements is preferably given to the looper J by securing it to a rock-shaft $J^3$, journaled in a suitable bearing $J^4$ on the revolving arm $J^5$, by which the looper is given its bodily movement, and by providing this rock-shaft $j^3$ with an arm $J^6$, having a pin or roller $J^7$, that travels in a stationary cam $J^8$ on the frame of the machine as the arm $J^5$ revolves. A coil-spring $J^9$ may also be employed to hold the looper J in position for engagement; but the cam $J^8$ may be in the form of a groove, as indicated in the drawings, so that the cam will axially rock the looper-shaft in both directions. The revolving arm $J^5$, by which the looper is given its bodily movement, is preferably made adapted to reciprocate in a revolving head $J^{10}$, so that the movement of the looper J away from the needle or punch G to form the loop of the required length may be in part produced by the rotary movement of the looper-carrying arm $J^5$, and in part by the radially-sliding movement of said arm, the arm $J^5$ being furnished with a pin or roller $J^{11}$, working in a stationary cam $J^{12}$ to produce the radially-sliding movement of the arm $J^5$. By this means, by simply changing the cam-plate, the pull or throw of the looper may be made greater or less as required for tags for different uses or of different sizes, without making any change in the relative positions of the threading-needle and knotter. The loop-holder J' is stationary on the frame of the machine. It, however, may be fixed to the frame of the machine at different distances from the knotter, as may be required in forming tags with different lengths of loop or string. The movable jaw $J^2$ of the supplemental loop-holder J' is preferably operated or opened and closed by a lever $j$, connected by a link $j'$ with the movable jaw $J^2$, said lever $j$ being actuated by a cam $j^3$ on the cam-shaft V.

The tag-stripping device K may preferably consist simply of a spring stationarily affixed to the frame of the machine, as indicated in Fig. 3 of the drawings.

The clamping or tension jaws L L', or rather the movable one L of said jaws, is preferably operated by a lever $L^2$, pivoted to the frame and connected by a pivoted link $L^4$ with the jaw L, the jaw L being pivoted at $L^5$ to the stationary jaw L', and the lever $L^2$ being actuated by a cam $L^6$ on the cam-shaft V. A spring $L^7$ serves to move the jaw L in one direction, the direction to open it.

The revolving hook or wiper M of the knotter is preferably formed of spring metal, so that the two jaws of this spring-hook slightly clamp or grasp the strands of the string, and it is preferably revolved or actuated by attaching it to a revolving sleeve M', journaled on the frame at $M^2$, and to which is secured a gear $M^3$, that meshes with a gear $M^4$ on a shaft $M^5$, carrying a bevel-gear $M^6$, which meshes with a bevel-gear $M^7$ on the cam-shaft V. A simple continuous rotary movement is thus communicated to the wrapping or wiping hook M.

The necessary up-and-down reciprocating movement is communicated to the non-revolving tying bolt or mandrel N, preferably, by means of a cam or projection N', secured to the revolving head $J^{10}$ on the shaft $J^{13}$ in connection with a coil-spring $N^2$.

The necessary reciprocating movement is communicated to the knotter-hook P by means of a slide P', actuated by a cam $P^2$ on the cam-shaft V and connected by a link $P^3$ with the knotter-hook or its stem $P^4$.

The necessary movement is communicated to the guard O of the knotter by a pin or projection O' on the stem $P^4$, which fits in a slot $O^2$ on the sleeve or stem $O^3$ of the guard O.

The movable knife Q of the string-cutter is preferably operated by a lever $Q^2$, actuated by a cam $Q^3$ on the cam-shaft V and connected by a link $Q^4$ with the bent arm $Q^5$ of the knife Q, which is pivoted at $Q^6$ to the frame of the machine, a spring $Q^7$ being provided to retract or open the knife.

The stripper or discharging device S is preferably given two movements, one a rocking movement to turn this stripper-hook into position for engaging and releasing the loop of the tag, and the other a bodily movement for pulling or stripping the tag away from the knotting mechanism of the machine and delivering it to the receiver T. The rocking movement of the stripping device or hook S is preferably given to it by providing it with a rock-shaft S', journaled in the head $S^2$ on the revolving arm $S^3$, by which the revolving or bodily movement is given. A coiled spring $S^4$ serves to hold the hook or device S in proper position for engaging the loop of the tag, and an arm $S^5$, engaging a stationary pin or projection $S^6$ on the frame of the machine, serves to turn the hook S into proper position for releasing the loop of the tag after the tag has been strung upon the receiving hook or pin T. The bodily movement is preferably communicated to the hook or device S by a revolving shaft $S^7$, to which the arm $S^3$ is secured by a coupling $S^9$, the shaft $S^7$ being driven by a gear $S^{10}$ thereon meshing with a gear $S^{11}$ on the cam-shaft V.

The connecting-links $Q^4$ $L^4$ are preferably furnished with right and left threaded adjusting-nuts $q$.

U' indicates a crank which may be used for turning the driving-shaft U.

While I have in the drawings and above description set forth the particular form, kind, and construction of the several operative parts or devices which I prefer to use as part of my machine in practicing my invention, and while certain features of my invention consist in the novel construction of certain of these parts, it will of course be understood by those skilled in the art that the construction of many of these parts or devices may be greatly varied without departing from my invention, and that my invention is not confined to the particular kind or construction of tag-strip feed device, printing device, cutting and punching device, tag threading or stringing device, looper, thread-holder, knotter, stripper, &c., nor to the particular means shown and described for communicating the necessary movements to the several moving parts.

The shaft $J^{13}$, which operates the looper J, is driven by a gear $J^{14}$ on the driving-shaft U, which meshes with a gear $J^{15}$ on shaft $J^{16}$, carrying gear $J^{17}$, meshing with gear $J^{18}$ on said shaft $J^{13}$.

The cam-shaft V is driven by a gear V' on driving-shaft U, which meshes with gear $V^2$ on vertical cam-shaft $V^3$, carrying gear $V^4$, meshing with gear $V^5$ on shaft $V^6$, which carries a gear $V^7$, that meshes with the gear $V^8$ on cam-shaft V. A spring $O^4$ serves to force the guard or collar O down against the tying-bolt N. A spring $P^5$ serves to force the knotter-hook P down into position in the tying-bolt N.

Tags of longer or shorter lengths may be made by varying the feed, this being preferably done by changing the mutilated gear $C^2$ to one having a greater or less number of teeth, the relative position of the tag cutting and punching and printing devices being suitably changed or adjusted.

The looper J is given an inclined path of revolution, as indicated in the drawings, so that the revolving wrapper-hook M may first pass over the strands of the loop and then astride said strands to properly catch them, as indicated at Fig. 12.

The bearing or guide $N^{11}$ for the tying-bolt N and other connected parts is supported by a vertical standard or hanger $N^{12}$, so that the looper J may revolve around the same unobstructedly.

I claim—

1. In a machine for making tags, the combination with a tag-strip guide, of a tag-strip feeder, a printing device, a device for forming and cutting the tag from the tag-strip, a device for forming the hole in the end of the tag, a tag threading or stringing device or needle, a string-holder for the end of the string, a device for stripping the tag from the threading or stringing device, a looper, a loop-holder, a string clamping or tension device through which the slack for the knot is pulled, a thread or string cutter, a knotter or tying device, a device for stripping or discharging the strung tag from the knotter, and a device for receiving the finished tags as they are made, substantially as specified.

2. The combination with a tag-strip feeder, of a punch for forming a hole in the tag-strip near the end thereof, a tag-threading device reciprocating through the hole in the tag-strip, a cutter for severing the threaded tag from the tag-strip, a looper and a knotter, said tag-strip feeder serving to feed the tag-strip first into position for punching said hole and then into a second position to bring said hole into registry with said threading device, substantially as specified.

3. The combination with a tag threading punch or needle reciprocating through the tag and having an eye near its lower end, to carry the thread through the tag, a holder for the end of the thread, of a looper engaging the loop of the thread carried through the tag, and a knotter, substantially as specified.

4. The combination with a punch for making a hole in the end of the tag-strip, of a threading punch or needle reciprocating through the tag and having an eye near its lower end to carry the thread through the tag-strip, a tag-strip feeder for feeding the tag-strip forward from the hole-forming punch into registry with the threading punch or needle, and a cutter for severing the threaded tag from the tag-strip, substantially as specified.

5. The combination with a punch for making a hole in the end of the tag-strip, of a threading punch or needle reciprocating through the tag and having an eye near its lower end to carry the thread through the tag-strip, a tag-strip feeder for feeding the tag-strip forward from the hole-forming punch into registry with the threading punch or needle, a holder for the thread or string, and a cutter for severing the threaded tag from the tag-strip, substantially as specified.

6. The combination with a tag-threading device of a holder for the end of the string, and a looper, substantially as specified.

7. The combination with a tag-threading device of a holder for the end of the string, a looper and a stripper for stripping the tag from the threading device, substantially as specified.

8. The combination with a tag-strip guide of a tag-strip feed, a printing device, a cutting device, and a hole-punching device, a tag-threading punch or needle, a holder for the end of the thread or string, and a looper substantially as specified.

9. The combination with a tag-strip guide of a tag-strip feeder, a printing device, a cutting device, a hole-punching device, and a tag-threading punch or needle, a holder for the end of the thread or string, a looper and a knotter substantially as specified.

10. The combination with a tag-threading punch a holder for the end of the thread or string of a movable looper and a stationary loop-holder, substantially as specified.

11. The combination with a tag-threading punch a holder for the end of the thread or string and a looper, of a clamp or tension-jaws for holding tensionally the two strands of the loop, substantially as specified.

12. The combination with a tag-threading punch a holder for the end of the thread or string and a looper, of a clamp or tension-jaws for holding tensionally the two strands of the loop, and a knotter, substantially as specified.

13. The combination with a tag-threading punch and a looper, of a clamp or tension-jaws for holding tensionally the two strands of the loop, a knotter comprising a revolving wrapping-hook or wiper, a notched or lipped tying-bolt or mandrel, a guard, and a knotter-hook, substantially as specified.

14. The combination with a loop-holder of a tension-clamp for the strands of the loop, a hollow notched tying-bolt or mandrel, a revolving wrapping-hook or wiper, a guard, and a knotter-hook, substantially as specified.

15. The combination with a loop-holder of a tension-clamp for the strands of the loop, a revolving wrapping-hook or wiper, a reciprocating hollow notched tying-bolt or mandrel, a reciprocating hollow guard and a reciprocating knotter-hook inside the hollow guard and tying-bolt, substantially as specified.

16. The combination with a threading-punch, of a holder for the end of the string, a looper, a tension-clamp for the two strands of the loop, a tying-bolt a reciprocating hollow guard and a reciprocating knotter-hook inside the hollow guard and tying-bolt, substantially as specified.

17. The combination with a threading-punch of a tag-stripper, a holder for the end of the string, a looper, a tension-clamp for the two strands of the loop, a tying-bolt a reciprocating hollow guard and a reciprocating knotter-hook inside the hollow guard and tying-bolt, substantially as specified.

18. The combination with a threading-punch of a holder for the end of the string, a looper, a tension-clamp for the two strands of the loop, a thread or string cutter, a tying-bolt, a reciprocating hollow guard and a reciprocating knotter-hook inside the hollow guard and tying-bolt, substantially as specified.

19. The combination with a threading-punch of a holder for the end of the string, a tag-stripper, a looper, a tension-clamp for the two strands of the loop, a thread-cutter, a tying-bolt a reciprocating hollow guard and a reciprocating knotter-hook inside the hollow guard and tying-bolt, substantially as specified.

20. The combination with a loop-holder of a tension-clamp for the two strands of the loop, a knotter and a stripping or discharging device for withdrawing the strung tag from the knotter, substantially as specified.

21. The combination with a loop-holder of a tension-clamp for the two strands of the loop, a knotter and a stripping or discharging device for withdrawing the strung tag from the knotter, said stripping or discharging device consisting of a rocking hook mounted on a revolving arm, the rocking movement of the hook serving to release the strung tag, substantially as specified.

22. The combination with a tag-threading punch or needle, of a device for holding the end of the thread and a bodily and axially movable looper, substantially as specified.

23. The combination with a tag-threading punch or needle, of a device for holding the end of the thread and a bodily and axially movable looper and a supplemental loop-holder, substantially as specified.

24. The combination with a tag-threading punch or needle, of a device for holding the end of the thread and a bodily and axially movable looper and a supplemental loop-holder having an opening and closing jaw, substantially as specified.

25. The combination with a tag-threading punch or needle, of a device for holding the end of the thread and a bodily and axially movable looper consisting of a hook secured to a rock-shaft carried on a revolving arm, substantially as specified.

26. The combination with a tag-threading punch or needle, of a device for holding the end of the thread and a bodily and axially movable looper consisting of a hook secured to a rock-shaft carried on a revolving and radially-sliding arm, substantially as specified.

27. The combination with a tag-threading punch or needle, of a device for holding the end of the thread and a bodily and axially movable looper consisting of a hook secured to a rock-shaft carried on a revolving and radially-sliding arm, and a cam for radially sliding said arm as it revolves, substantially as specified.

28. The combination with a tag-strip guide of a feeder for the tag-strip, a printing device, a tag forming and cutting die E having two cutting edges $e$ and $e'$, and two opposing cutters $E'$ $E'$, a punch and die for forming the hole in the end of the tag, a tag-threading needle or punch having an eye near its lower end, a holder for the end of the thread, and a looper substantially as specified.

29. The combination with a tag-strip guide of a feeder for the tag-strip, a printing device, a tag forming and cutting die E having two cutting edges $e$ and $e'$, and two opposing cutters $E'$ $E'$, and a punch and die for forming the hole in the end of the tag, a threading needle or punch having an eye for holding the end of the thread, a looper and a knotter substantially as specified.

30. The combination with a tag-strip guide of a feeder for the tag-strip, a printing device, a tag forming and cutting die E having two cutting edges $e$ and $e'$, and two opposing cutters $E'$ $E'$, and a punch and die for forming the hole in the end of the tag, and a tag-threading punch, a holder for the end of the thread, a looper, a knotter and a device for stripping the tag from the threading-punch substantially as specified.

31. The combination with a tag-strip guide and a tag-strip feeder, of a tag-cutter die having two cutting edges $e\ e'$ and two opposing cutters $E'\ E'$, a tag-threading needle or punch having an eye near its lower end, a holder for the end of the thread, a looper, an opening and closing tension-clamp for the two strands of the loop, and a knotter substantially as specified.

32. The combination with a tag-strip guide and a tag-strip feeder, of a tag-cutter die having two cutting edges $e\ e'$ and two opposing cutters $E'\ E'$ and a punch and die for forming the hole in the end of the tag, a tag-threading needle or punch having an eye near its lower end, a holder for the end of the thread, a looper, an opening and closing tension-clamp for the two strands of the loop, and a knotter substantially as specified.

33. The combination with a tag-strip guide and a tag-strip feeder, of a tag-cutter die having two cutting edges $e\ e'$ and two opposing cutters $E'\ E'$ and a punch and die for forming the hole in the end of the tag, and a tag-threading punch, a holder for the end of the thread, a movable looper, an opening and closing tension-clamp for the two strands of the loop substantially as specified.

34. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, a movable looper and a knotter substantially as specified.

35. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, said tag-threading punch being provided with a spring $g'$ to keep the thread or string from slipping backward, a movable looper and a knotter substantially as specified.

36. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and a movable looper J, substantially as specified.

37. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch and looper, said punch G frictionally fitting the hole in the tag and serving to lift the tag from its bed as said punch is withdrawn, so that the looper will engage the thread or string below the tag and thus serve to withdraw the tag or carry it out of the way on the upper or feeding strand of the loop, substantially as specified.

38. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and bodily-movable pivotal looper J mounted on a revolving arm, substantially as specified.

39. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and bodily-movable pivotal looper-hook J mounted on a revolving arm, and an opening and closing tension-clamp L L' for the two strands of the loop, substantially as specified.

40. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, said tag-threading punch being provided with a spring $g'$ to keep the thread or string from slipping backward, and bodily-movable pivotal looper-hook J mounted on a revolving arm, and an opening and closing tension-clamp L L' for the two strands of the loop, and a supplemental loop-holder J', substantially as specified.

41. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and a bodily-movable pivotal hook J mounted on a revolving arm, and an opening and closing tension-clamp L L' for the two strands of the loop, and a thread-cutter Q Q', substantially as specified.

42. The combination with a reciprocating tag-threading punch G having a hole or eye on its front side for the end of the string to project through, of an opening and closing thread-holding clamp H H' arranged and adapted to grasp and hold the end of the thread projecting through the eye of said tag-threading punch, and bodily-movable pivotal looper-hook J mounted on a revolving arm, and an opening and closing tension-clamp L L' for the two strands of the loop, and a knotter, substantially as specified.

43. The combination with a reciprocating tag-threading punch G of a hole or eye $g$ on its front side for the end of the string to project through, of an opening and closing thread-holding clamp H H' arranged and adapted to grasp and hold the end of the thread projecting through the eye of said tag-threading punch, and bodily-movable pivotal looper-hook J mounted on a revolving arm, and an opening and closing tension-clamp L L' for the two strands of the loop, and a knotter comprising a revolving spring wrapping-hook M, a reciprocating hollow tying-bolt or mandrel N having lip $n$ and notch $n'$, a reciprocating guard or collar O fitting on the end of the tying-bolt or mandrel N, and a knotter-hook P reciprocating inside the hollow guard O and tying-bolt N, substantially as specified.

44. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and bodily-movable pivotal looper-hook J mounted on a revolving arm, and an opening and closing tension-clamp L L' for the two strands of the loop, and a knotter, and a bodily-movable pivotal stripping or discharging hook S mounted on a revolving arm, substantially as specified.

45. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and bodily-movable pivotal looper-hook J mounted on a revolving arm, and an opening and closing tension-clamp L L' for the two strands of the loop, a knotter, a movable stripping or discharging hook S and a receiving hook or spindle T, substantially as specified.

46. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and bodily-movable pivotal looper-hook J mounted on a revolving arm, and an opening and closing tension-clamp L L' for the two strands of the loop, and a knotter having a reciprocating tying-bolt or mandrel N, and a revolving head $J^{10}$ upon which the arm carrying the looper J is mounted, said revolving head having a cam or projection N' for reciprocating the tying-bolt or mandrel N, substantially as specified.

47. The tying-bolt N having conical end and provided with transverse notch $n'$ and longitudinal slot $n^2$, substantially as specified.

48. The hollow tying-bolt N having shoulder or lip $n$ and slot $n^2$, substantially as specified.

49. The hollow tag-threading punch G having eye $g$ near its lower end, in combination with a holder for the end of the thread, and a movable looper engaging the loop of the thread between the eye of the punch and said holder substantially as specified.

50. The hollow tag-threading punch G having eye $g$ near its lower end and provided with spring $g'$, in combination with a holder for the end of the thread, and a movable looper engaging the loop of the thread between the eye of the punch and said holder substantially as specified.

51. The hollow tag-threading punch G having eye $g$ near its lower end, and eye $g^2$ for admission of the string or thread, in combination with a holder for the end of the thread, and a movable looper engaging the loop of the thread between the eye of the punch and said holder substantially as specified.

52. The combination of hollow tying-bolt N having shoulder or lip $n$ and slot $n^2$, with revolving wrapping-hook M, substantially as specified.

53. The combination of hollow tying-bolt N having shoulder $n$ and slot $n^2$, with revolving wrapping-hook M and knotter-hook P, substantially as specified.

54. The combination with a reciprocating tag-threading punch G having a hole or eye $g$ on its front side for the end of the string to project through, of an opening and closing thread-holding clamp H H' arranged and adapted to grasp and hold the end of the thread projecting through the eye of said tag-threading punch, and bodily-movable pivotal looper-hook J mounted on a revolving arm, and an opening and closing tension-clamp L L' for the two strands of the loop, and a knotter, and a revolving head $J^{10}$ upon which the arm carrying the looper J is mounted, the axis or shaft of said revolving head being arranged at an angle to the tying-bolt or mandrel substantially as specified.

55. The combination with a hollow reciprocating tag-threading punch G, having an eye or hole $g$ for the end of the string to project through, of a holder H H' for the end of the string, and a cutter Q Q' for severing the string, and a movable looper J engaging the loop of the thread between said holder and said eye of the punch substantially as specified.

56. The combination with a movable knotting-hook of tying-bolt N having conical top and provided with a longitudinal channel or way for the knotting-hook to work in and means for causing or permitting the wrap to come into engagement with the knotting-hook and means for allowing the knot to be stripped from the tying-bolt by the separation of the knotting-hook from the tying-bolt, and means for separating the knotting-hook from the tying-bolt substantially as specified.

57. The combination with a movable knotting-hook of a tying-bolt N having a longitudinal channel or way for the knotting-hook to work in and a transverse notch for causing or permitting the wrap wound about the tying-bolt to come into engagement with the knotting-hook, said tying-bolt also having means for permitting the knot to be stripped therefrom by the separation of the knotting-hook from the tying-bolt, and means for separating the knotting-hook from the tying-bolt substantially as specified.

58. The combination with a movable knotting-hook of a tying-bolt N having a longitudinal channel or way for the knotting-hook to work in and means for causing or permitting the wrap wound about the tying-bolt to come into engagement with the knotting-hook, said tying-bolt also having means for permitting the knot to be stripped therefrom by the separation of the knotting-hook from the tying-bolt, and a revolving wrapping-hook M, and means for separating the knotting-hook from the tying-bolt substantially as specified.

59. The tying-bolt N having a longitudinal channel or way for the knotting-hook to work in and a transverse notch for causing or permitting the wrap wound about the tying-bolt to come into engagement with the knotting-hook, said tying-bolt also having means for permitting the knot to be stripped therefrom by the separation of the knotting-hook from the tying-bolt, in combination with revolving wrapping-hook M and knotter-hook P, and means for separating the knotting-hook from the tying-bolt substantially as specified.

60. The tying-bolt N having a longitudinal channel or way for the knotting-hook to work in and means for causing or permitting the wrap wound about the tying-bolt to come into engagement with the knotting-hook, said tying-bolt also having means for permitting the knot to be stripped therefrom, in combination with revolving wrapping-hook M, knotting-hook P and guard O, substantially as specified.

61. The combination with a tying-bolt N of a wrapping-hook M, knotting-hook P, guard O, said tying-bolt N having a longitudinal channel, passage or way for the knotter-hook to work in and to permit the knot to be slipped from said bolt, and means for permitting the wrap of the string about the bolt to come into engagement with the knotter-hook, substantially as specified.

62. The combination with a tying-bolt N, of a wrapping-hook M, knotter-hook P, and guard O, said tying-bolt N having notch $n'$ and also a longitudinal passage, channel or way for the knotter-hook and to permit the stripping of the knot from said bolt, substantially as specified.

63. The combination with a tying-bolt N, of wrapping-hook M, knotter-hook P and guard O, said tying-bolt N having a longitudinal slot $n^2$, and also means for permitting the knotter-hook to come into engagement with the wrap of the string about said bolt and for the stripping of the knot from the bolt, substantially as specified.

64. The combination with a tying-bolt N, of a wrapping-hook M, knotter-hook P and guard O, said tying-bolt N having a conical top, and means for permitting the knotter-hook to come into engagement with the wrap of the string about said bolt and for the stripping of the knot from said bolt, substantially as specified.

65. The combination with a tying-bolt N, of a wrapping-hook M, knotter-hook P and guard O, said tying-bolt N having a transverse notch $n'$ and longitudinal slot $n^2$, and a passage-way or channel for the knotter-hook, substantially as specified.

66. The combination with a tying-bolt N, of a wrapping-hook M, knotter-hook P and guard O, said tying-bolt N having a transverse notch $n'$, longitudinal slot $n^2$, a conical top, and a passage-way or channel for the knotter-hook, substantially as specified.

JOHN FLETCHER.

Witnesses:
W. T. BIGALOW,
WILLIAM C. HOOD.